(12) United States Patent
Liao (10) Patent No.: US 7,282,143 B2
(45) Date of Patent: Oct. 16, 2007

(54) SEPTIC TANK

(76) Inventor: Chin-Tuan Liao, No. 92, Hwa-Yan St., Pingtung County, Chao-Zhou (TW)

( * ) Notice: Subject to any disclaimer, the term of this patent is extended or adjusted under 35 U.S.C. 154(b) by 56 days.

(21) Appl. No.: 11/164,341

(22) Filed: Nov. 18, 2005

(65) Prior Publication Data

US 2006/0196827 A1 Sep. 7, 2006

Related U.S. Application Data (63) Continuation-in-part of application No. 10/931,743, filed on Sep. 1, 2004, now Pat. No. 7,001,514.

(30) Foreign Application Priority Data

Aug. 31, 2005 (TW) ............................. 94215065 U (51) Int. Cl.
B01D 21/02 (2006.01)

(52) U.S. Cl. ................... 210/195.3; 210/305; 210/521; 210/532.2

(58) Field of Classification Search ............. 210/532.2, 210/170.08, 195.1, 195.3, 194, 197, 299, 210/305, 521
See application file for complete search history.

(56) References Cited

U.S. PATENT DOCUMENTS

| | | | | |
|---|---|---|---|---|
| 872,412 A | 12/1907 | Greth | ....................... | 210/532.1 |
| 1,120,351 A | 12/1914 | Weston | ..................... | 210/532.2 |
| 1,485,623 A | * | 3/1924 | Mayo ....................... | 210/532.2 |
| 1,582,915 A | * | 5/1926 | Farley ...................... | 210/532.2 |
| 1,641,469 A | * | 9/1927 | Baker .......................... | 210/305 |
| 1,708,118 A | * | 4/1929 | Carpenter et al. ........ | 210/532.2 |
| 1,851,172 A | | 3/1932 | Gordon ....................... | 210/538 |
| 1,902,171 A | | 7/1933 | Kopp .......................... | 210/538 |
| 2,416,867 A | | 3/1947 | Coberly .................... | 210/532.2 |
| 2,552,452 A | | 5/1951 | Phillips ....................... | 210/528 |
| 2,987,186 A | | 6/1961 | Burgoon et al. ............ | 210/220 |
| 3,741,393 A | | 6/1973 | Estes et al. ................. | 210/195 |
| 3,826,375 A | | 7/1974 | Carlson et al. ............. | 210/519 |
| 3,986,963 A | | 10/1976 | Maroschak ............. | 210/532 S |
| 4,002,561 A | * | 1/1977 | Traverse ................... | 210/532.2 |
| 4,104,166 A | | 8/1978 | LaRaus .................. | 210/195 R |
| 4,132,652 A | * | 1/1979 | Anderson et al. ........... | 210/521 |
| 4,157,969 A | * | 6/1979 | Thies .......................... | 210/521 |
| 4,179,375 A | | 12/1979 | Smith ......................... | 210/197 |
| 4,250,040 A | | 2/1981 | LaRaus ...................... | 210/760 |
| 4,334,991 A | | 6/1982 | Beede ......................... | 210/232 |
| RE32,312 E | | 12/1986 | Crates et al. ............ | 210/532.2 |
| 4,715,966 A | | 12/1987 | Bowman .................... | 210/800 |
| 4,832,846 A | | 5/1989 | Gavin ..................... | 210/532.2 |
| 4,886,605 A | | 12/1989 | Herve ......................... | 210/170 |
| 4,997,562 A | | 3/1991 | Warner ....................... | 210/259 |

(Continued)

Primary Examiner—Christopher Upton
(74) Attorney, Agent, or Firm—Alan Kamrath; Kamrath & Associates P.A (57) ABSTRACT

A septic tank includes a chamber, an inlet through which waste water enters the chamber, an outlet, and an outlet pipe mounted to the outlet. At least one partitioning member is mounted in the chamber and separates the chamber into at least a first subchamber adjacent to the inlet and a second subchamber adjacent to the outlet. The partitioning member includes a plurality of through-holes allowing communication between the first subchamber and the second subchamber. The partitioning member prevents the suspensions and deposits in the first subchamber from entering the second subchamber. A submersible pump may be mounted in the first subchamber for creating recycling currents.

17 Claims, 9 Drawing Sheets

U.S. PATENT DOCUMENTS

| | | | |
|---|---|---|---|
| 5,382,357 A | 1/1995 | Nurse | 210/170 |
| 5,441,632 A | 8/1995 | Charon | 210/170 |
| 5,482,621 A | 1/1996 | Nurse | 210/170 |
| 5,569,387 A | 10/1996 | Bowne et al. | 210/754 |
| 5,618,445 A | 4/1997 | Gavin | 210/800 |
| 5,762,790 A | 6/1998 | Zoeller | 210/238 |
| 5,997,735 A | 12/1999 | Gorton | 210/151 |
| 6,012,871 A | 1/2000 | Bryant | 405/40 |
| 6,015,488 A | 1/2000 | Gavin | 210/123 |
| 6,077,448 A * | 6/2000 | Tran-Quoc-Nam et al. | 210/521 |
| 6,136,190 A | 10/2000 | Zoeller et al. | 210/299 |
| 6,234,200 B1 | 5/2001 | Hall | 137/590 |
| 6,261,452 B1 | 7/2001 | Mayer | 210/256 |
| 6,267,882 B1 | 7/2001 | Houck et al. | 210/170 |
| 6,274,033 B1 | 8/2001 | Hudgin | 210/86 |
| 6,280,614 B1 | 8/2001 | Berg et al. | 210/170 |
| 6,296,775 B1 * | 10/2001 | Moody et al. | 210/532.2 |
| 6,331,247 B1 | 12/2001 | Zoeller et al. | 210/299 |
| 6,447,680 B1 | 9/2002 | Richard | 210/532.2 |
| 6,495,040 B1 | 12/2002 | Zoeller et al. | 210/299 |

* cited by examiner

Fig. 9 ly filed Sep. 1, 2004 now U.S. Pat. No. 7,001,514.

SEPTIC TANK

CROSS REFERENCE TO RELATED APPLICATION

This is a continuation-in-part application of U.S. patent application Ser. No. 10/931,743 filed Sep. 1, 2004 now U.S. Pat. No. 7,001,514.

BACKGROUND OF THE INVENTION

1. Field of the Invention

The present invention relates to a septic tank. More specifically, the present invention relates to a septic tank for treating household waste water including human feces in daily life.

2. Description of the Related Art

Household waste water containing human feces is firstly collected in a septic tank in a basement of a building. Cleaner waste water after purification is discharged to adjacent water discharge pipes to avoid contamination to drinking water and the environment. The decayed and deposited sludge in the septic tank is removed when it is accumulated to a certain amount.

Organic nitrogen in the septic tank is decomposed by nitrobacteria into ammonia, which is then oxidized into nitrate that is less toxic. The amount of organic nitrogen contained in the discharged water is reduced to achieve the purification purposes. For purification of the waste water in the septic tank, a stirring device or pump is mounted in the septic tank for stirring or recycling the sludge, providing re-filtering and/or re-decomposition effect. However, the stirring or recycling procedure would destroy the environment for the nitrobacteria. Further, stirring and fast recycling would adversely affect the effect of decomposition and filtration, failing to purify the waste water. More specifically, the high speed recycling currents are created in the septic tank when the pump or stirring device operates. As a result, the sludge providing the environment for growth and propagation of the nitrobacteria could not effectively gather and deposit. Further, the water discharged from the septic tank is not clear enough.

SUMMARY OF THE INVENTION

A septic tank in accordance with the present invention comprises a chamber, an inlet through which waste water enters the chamber, an outlet, and an outlet pipe mounted to the outlet. At least one partitioning member is mounted in the chamber and separates the chamber into at least a first subchamber adjacent to the inlet and a second subchamber adjacent to the outlet. The partitioning member comprises a plurality of through-holes allowing communication between the first subchamber and the second subchamber.

The partitioning member prevents suspensions and deposits in the first subchamber from entering the second subchamber. Preferably, the partitioning member comprises an upper blocking area for preventing the suspensions in the first subchamber from entering the second subchamber and a lower blocking area for preventing the deposits in the first subchamber from entering the second subchamber, with the through-holes being defined in an intermediate portion of the partitioning member.

In an embodiment of the invention, the septic tank comprises a plurality of tubes each including a first section extending through an associated through-hole and a second section extending downward and located in the first subchamber. The second section of each tube may be inclined or arcuate. The second section of each tube may have an inclining angle in a range of 30-60 degrees.

In another embodiment of the invention, the second section of each tube comprises a plurality of through-holes in a circumference thereof. Further, the second section of each tube comprises a closed end.

The septic tank may further include a submersible pump mounted in the first subchamber for creating recycling currents. The submersible pump may further comprise a recycling tube including an inlet in a bottom of the second subchamber.

In another embodiment of the invention, the septic tank further comprises a filtering/partitioning wall in a bottom of the chamber to define a deposit compartment.

In a further embodiment of the invention, the septic tank further comprises a partitioning wall to define a discharge compartment for receiving the outlet pipe. Preferably, the partitioning wall comprises a plurality of openings. The septic tank may further comprise an ultraviolet lamp mounted in the discharge compartment.

In still another embodiment of the invention, the partitioning member is wavy and comprises a plurality of wave crests and a plurality of wave troughs. The through-holes are defined in the wave crests and the wave troughs.

Preferably, each through-hole of the partitioning member is inclined and extends downward from the second subchamber side toward the first subchamber side.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
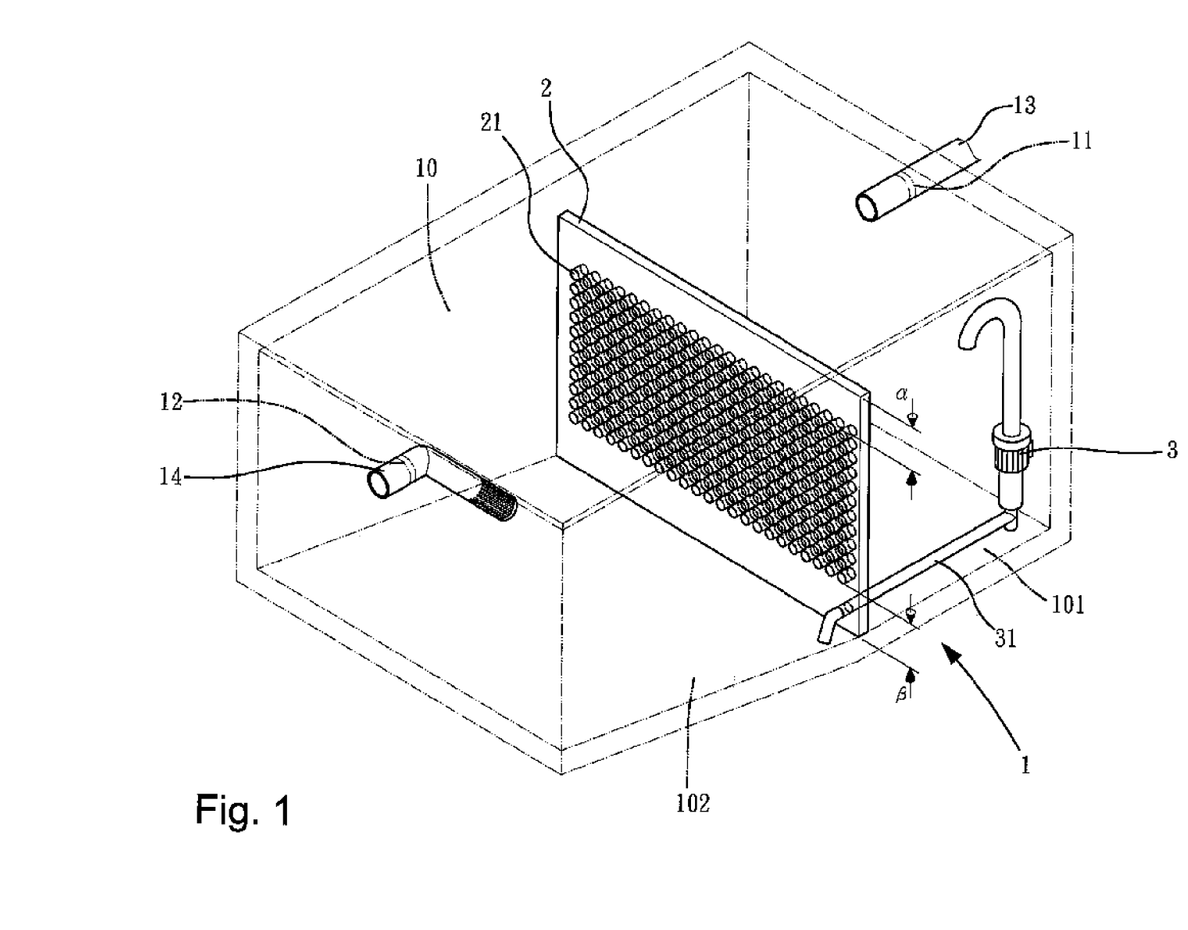
FIG. 1 is a perspective view of a septic tank in accordance with the present invention.
Figure 2:
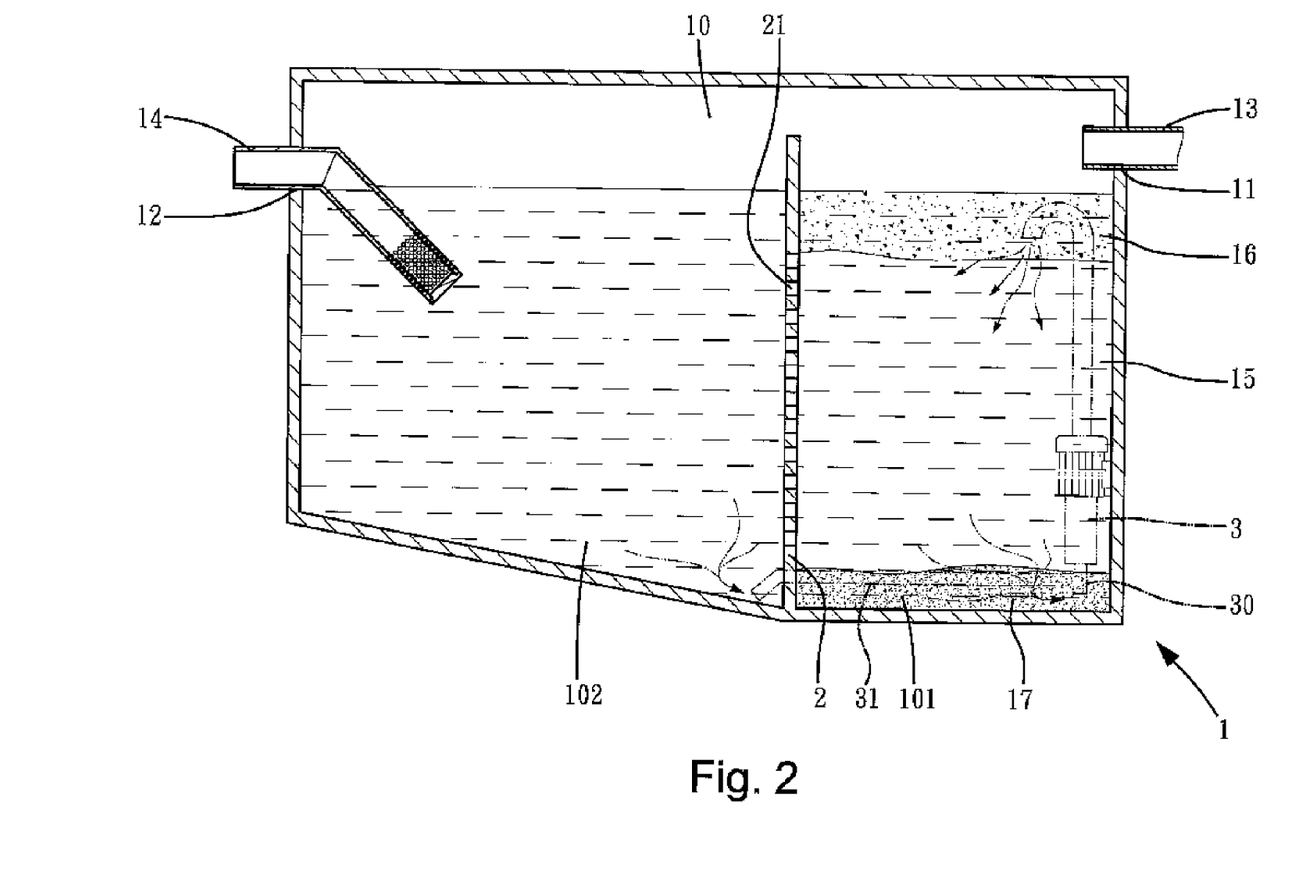
FIG. 2 is a sectional view of the septic tank in FIG. 1.

FIGS. 1 and 2 show an embodiment of a septic tank in accordance with the present invention. The septic tank comprises a chamber 10, a waste water inlet 11 to which an inlet pipe 13 is mounted, and a waste water outlet 12 to which an outlet pipe 14 is mounted. A partitioning member 2 is mounted in the chamber 10 and separates the chamber 10 into a first subchamber 101 adjacent to the waste water inlet 11 and a second subchamber 102 adjacent to the waste water outlet 12. The outlet 12 is preferably two (2) inches lower than the inlet 11.

The outlet pipe 14 can be of a structure similar to that disclosed in U.S. patent application Ser. No. 10/931,743, the content of which is incorporated herein for reference. A submersible pump 3 is mounted in the first subchamber 101, which will be described in detail later. The partitioning member 2 includes a plurality of through-holes 21 in an intermediate portion thereof, allowing communication between the first subchamber 101 and the second subchamber 102.

Referring to FIG. 2, household waste water (including waste water containing feces discharged from the toilets) enters the chamber 10 via the inlet pipe 13. Decomposed and decayed solids deposit at the bottom of the chamber 10 and thus becomes sludge (hereinafter referred to as "deposits"), forming a deposit section 17. Above the deposit section 17 is a dischargeable purified waste water section 15 that is sufficiently purified and thus dischargeable, and a suspension section 16 containing light suspensions is located above the dischargeable purified waste water section 15.

The submersible pump 3 pumps the deposit-containing waste water in the first subchamber 101 upward for creating recycling currents, thereby providing a stirring effect and speeding up the decomposition of the waste water.

When household waste water is discharged into the chamber 10 via the inlet pipe 13, the dischargeable waste water in the dischargeable purified waste water section 15 flows from the first subchamber 101 through the through-holes 21 of the partitioning member 2 into the second subchamber 102 and then is discharged outside via the outlet pipe 14. More specifically, the water level in the chamber 10 rises when the overall volume of the waste water (including feces) in the chamber 10 increases. The dischargeable purified waste water in the second subchamber 102 is discharged via the outlet pipe 14 when the waste water level is above the outlet 12. Detailed operation of the outlet pipe 14 is disclosed in U.S. patent application No. Ser. 10/931,743.

The partitioning member 2 with through-holes 21 slows down the speed of waste water currents (which is relatively strong when the submersible pump 3 operates) flowing from the first subchamber 101 into the second subchamber 102. More specifically, the suspensions in the first subchamber 101 are impeded by the partitioning member 2 and thus can not enter the second subchamber 102. Further, the speed of the suspensions in the first subchamber 101 is reduced by the partitioning member 2, and the suspensions easily deposit in the first subchamber 101, which is advantageous to adherence of nitrobacteria for decomposing organic nitrogen. The decomposing, filtering, and purifying effects of the waste water are improved.

Preferably, the through-holes 21 of the partitioning member 2 are inclined extend downward from the second subchamber side toward the first subchamber side, as shown in FIG. 2. This further slows down the speed of waste water flowing from the first subchamber 101 into the second subchamber 102 while allowing easy deposition of deposits in the first subchamber 101.

Still referring to FIGS. 1 and 2, the through-holes 21 are preferably defined in the intermediate portion of the partitioning member 2, with an upper blocking area α being provided on an upper portion of the partitioning member 2 for preventing the suspensions in the first subchamber 101 from entering the second subchamber 102, and with a lower blocking area β being provided on a lower portion of the partitioning member 2 for preventing the deposits in the first subchamber 101 from entering the second subchamber 101.

Referring to FIG. 2, the submersible pump 3 may include a recycling tube 31 having a first end connected to an inlet 30 of the submersible pump 3 and a second end with an inlet in a bottom of the second subchamber 102. The deposits in the bottom of the second subchamber 102 can be pumped back into the first subchamber 101 for refiltering purposes. The decomposing effect and filtering effect are further improved. The recycling tube 31 may include an inlet in the first subchamber 101 for recycling purposes.

Figures 3, 3A:
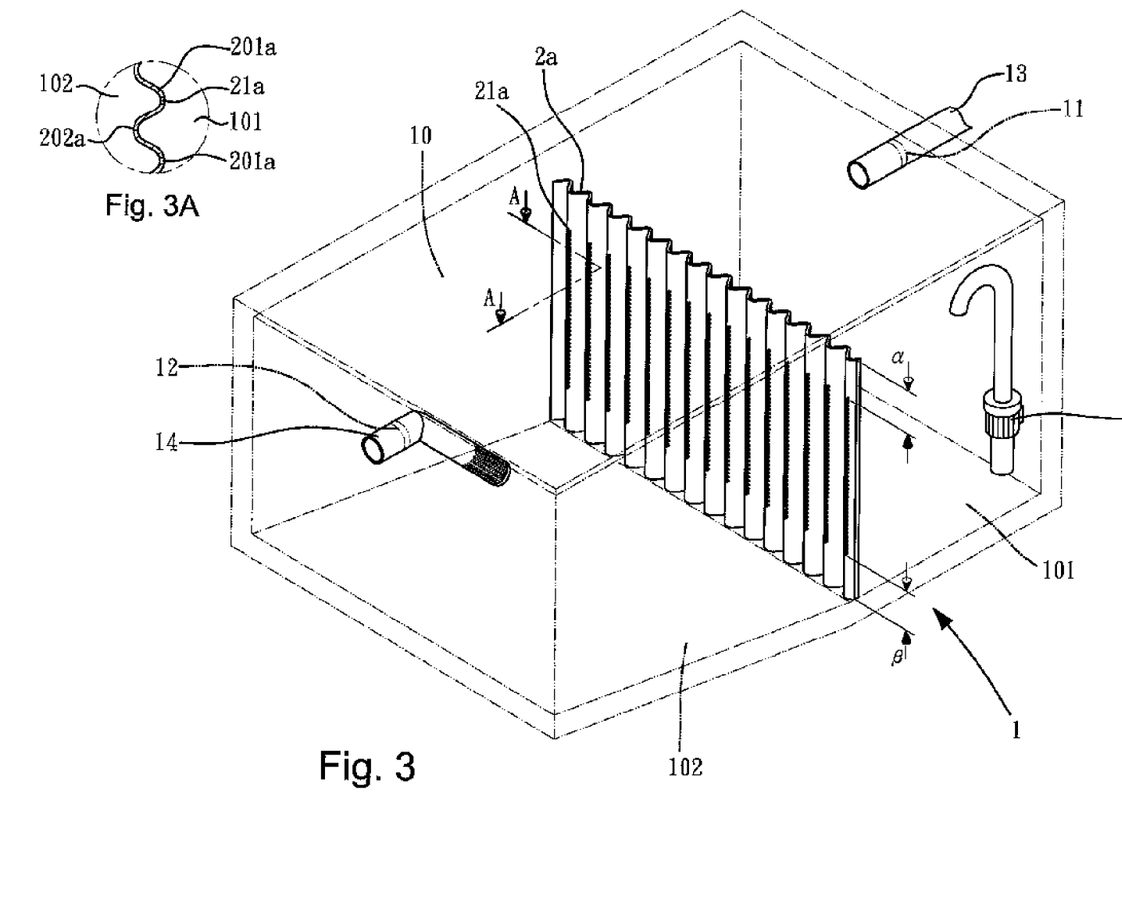
FIG. 3 is a perspective view of a modified embodiment of the septic tank in accordance with the present invention.
FIG. 3A is an enlarged sectional view taken along plane A-A in FIG. 3.

FIGS. 3 and 3A show a modified embodiment of the septic tank in accordance with the present invention, wherein the partitioning member 2a includes a plurality of through-holes 21a in an intermediate portion thereof. Further, the partitioning member 2a is wavy and includes a plurality of convex sections 201a and concave sections 202a, with the through-holes 21a being defined in the wave crests and the wave troughs. The convex sections 201a and the concave sections 202a further reduce the speed of waste water (which would be strong when the pump 3 operates) flowing from the first subchamber 101 into the second subchamber 102. Namely, the strong waste water currents resulting from operation of the pump 3 are retarded in the convex sections 201a and the concave sections 202a of the partitioning member 2a. Thus, it is difficult for the suspensions and the deposits in the first subchamber 101 to flow through the through-holes 21a into the second subchamber 102, as the suspensions and the deposits in the first subchamber 101 are impacted and dispersed and then deposit in the concave sections 202a. Further, since the wave crests include through-holes 21a, turbulence is created in the wave crests while the pump 3 is creating strong waste water currents, which turbulence causes difficulty for the suspensions and the deposits in the first subchamber 101 to flow into the second subchamber 102. The filtrating effect and purifying effect of the waste water are improved.

Figure 4:
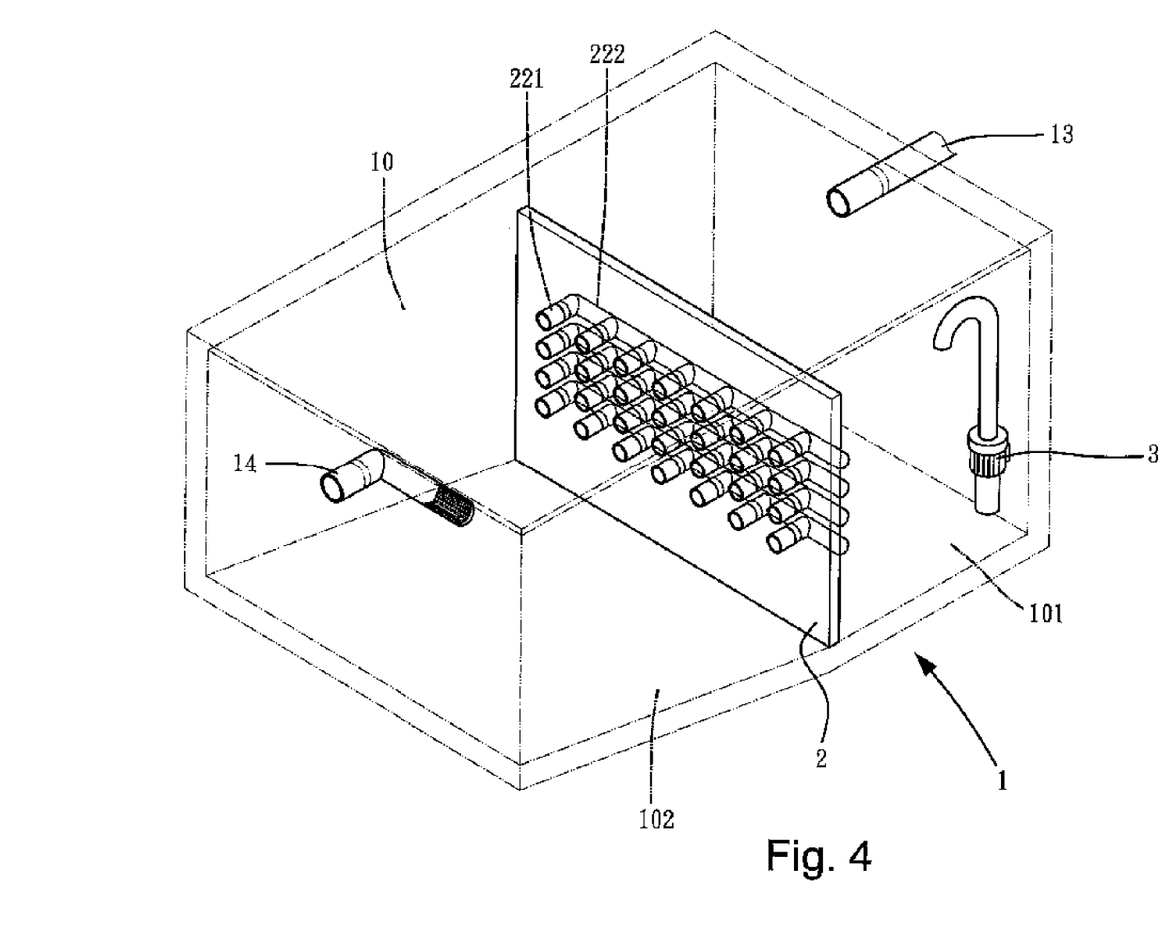
FIG. 4 is a perspective view of another modified embodiment of the septic tank in accordance with the present invention.
Figure 5:
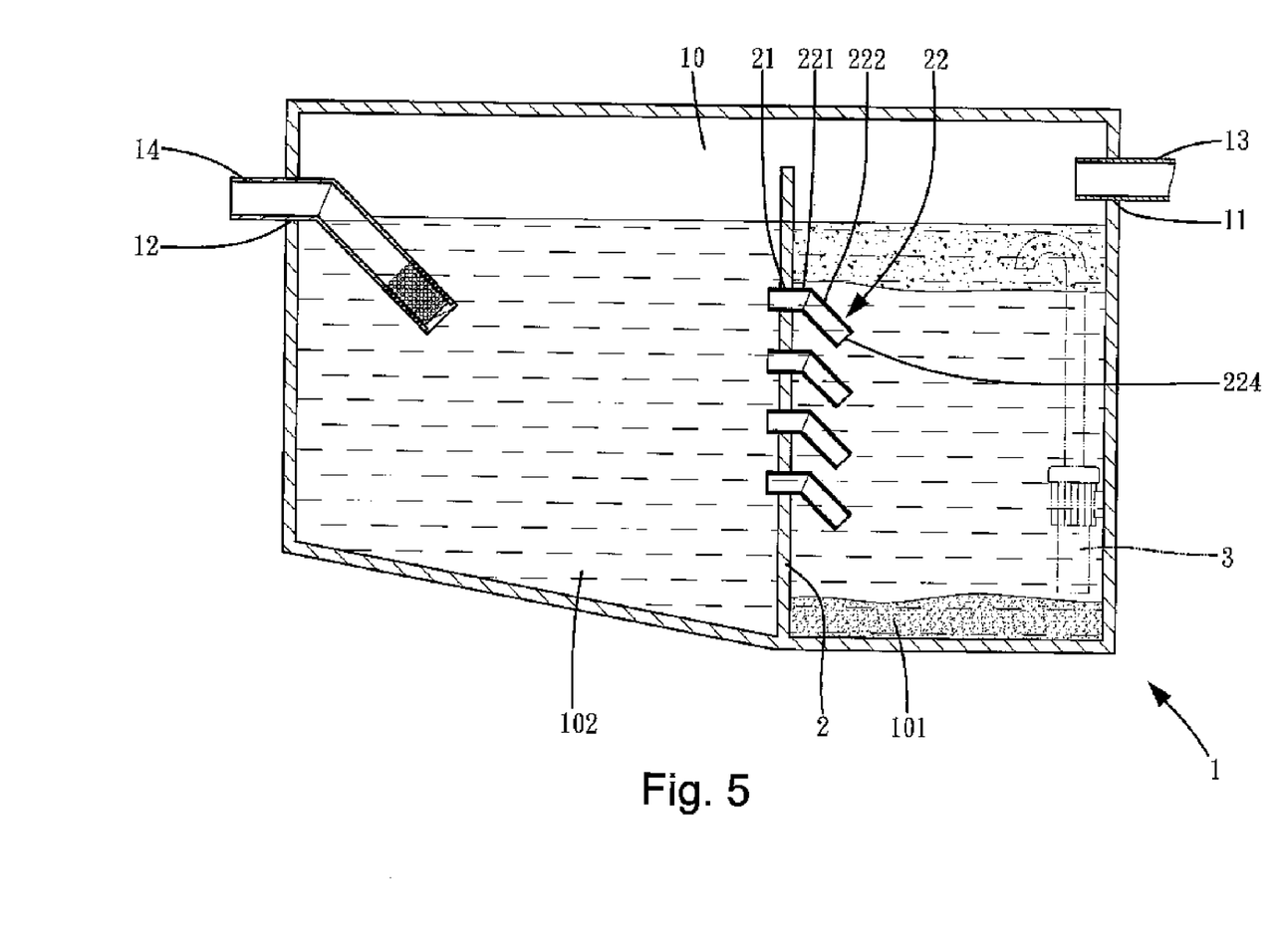
FIG. 5 is a sectional view of the septic tank in FIG. 4.

FIGS. 4 and 5 show another modified embodiment of the septic tank in accordance with the present invention, wherein a plurality of tubes 22 are mounted to the respective through-holes 21 of the partitioning member 2. In this embodiment, each tube 22 includes a first, horizontal section 221 extending from the first subchamber 101 through an associated through-hole 21 into the second subchamber 102. Each tube 22 further includes a second, inclined section 222 located in the first subchamber 101 and extending downward from the first horizontal section 221. The second inclined section 222 preferably has an inclining angle in a range of 30-60degrees and most preferably 45 degrees.

Figure 6:
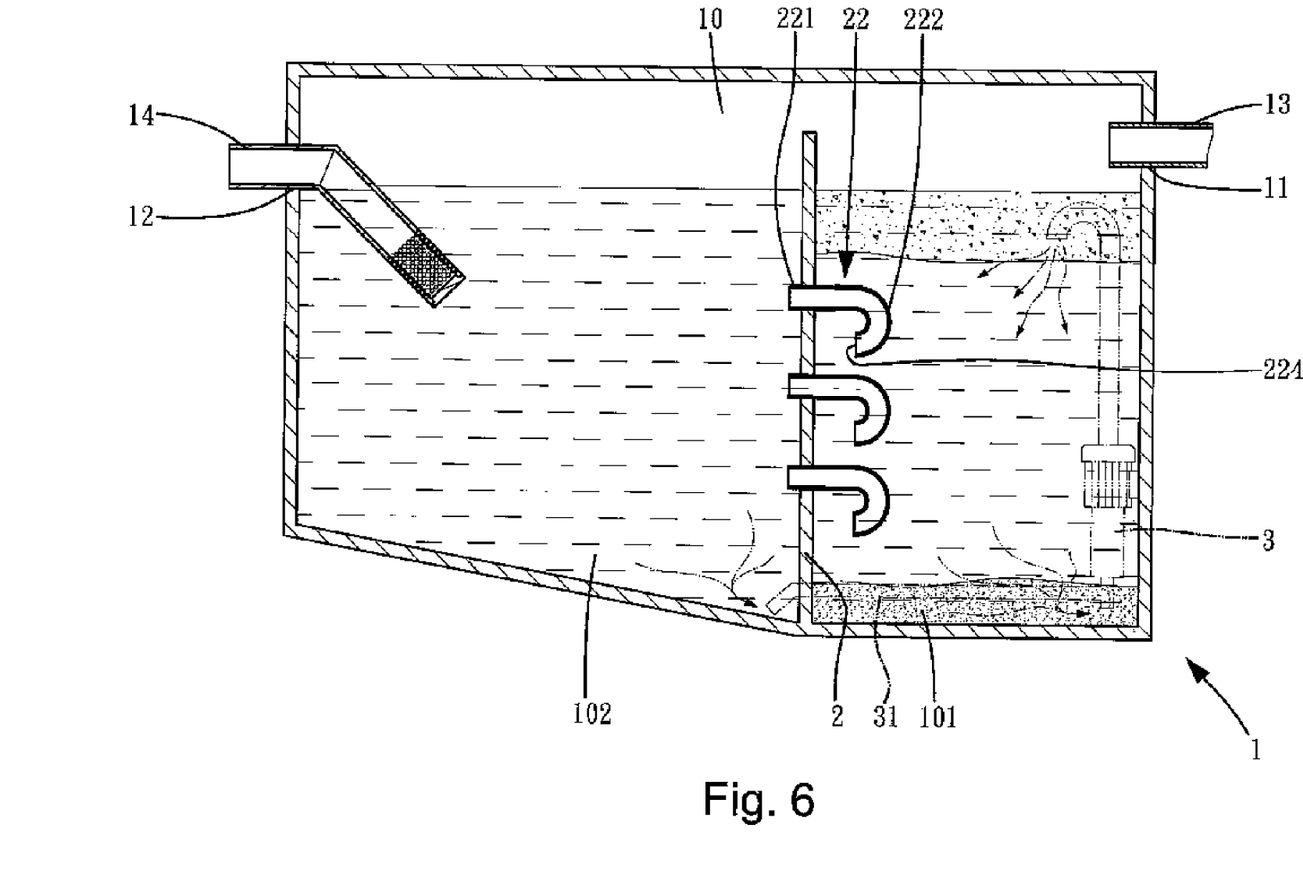
FIG. 6 is a sectional view of a further modified embodiment of the septic tank in accordance with the present invention.

FIG. 6 is a sectional view of a further modified embodiment of the septic tank modified from the embodiment of FIG. 5. In this embodiment, the second inclined section 222 of each tube 22 is arcuate. The recycling tube 31 in the embodiment shown in FIG. 2 can be used in this embodiment.

Figure 7:
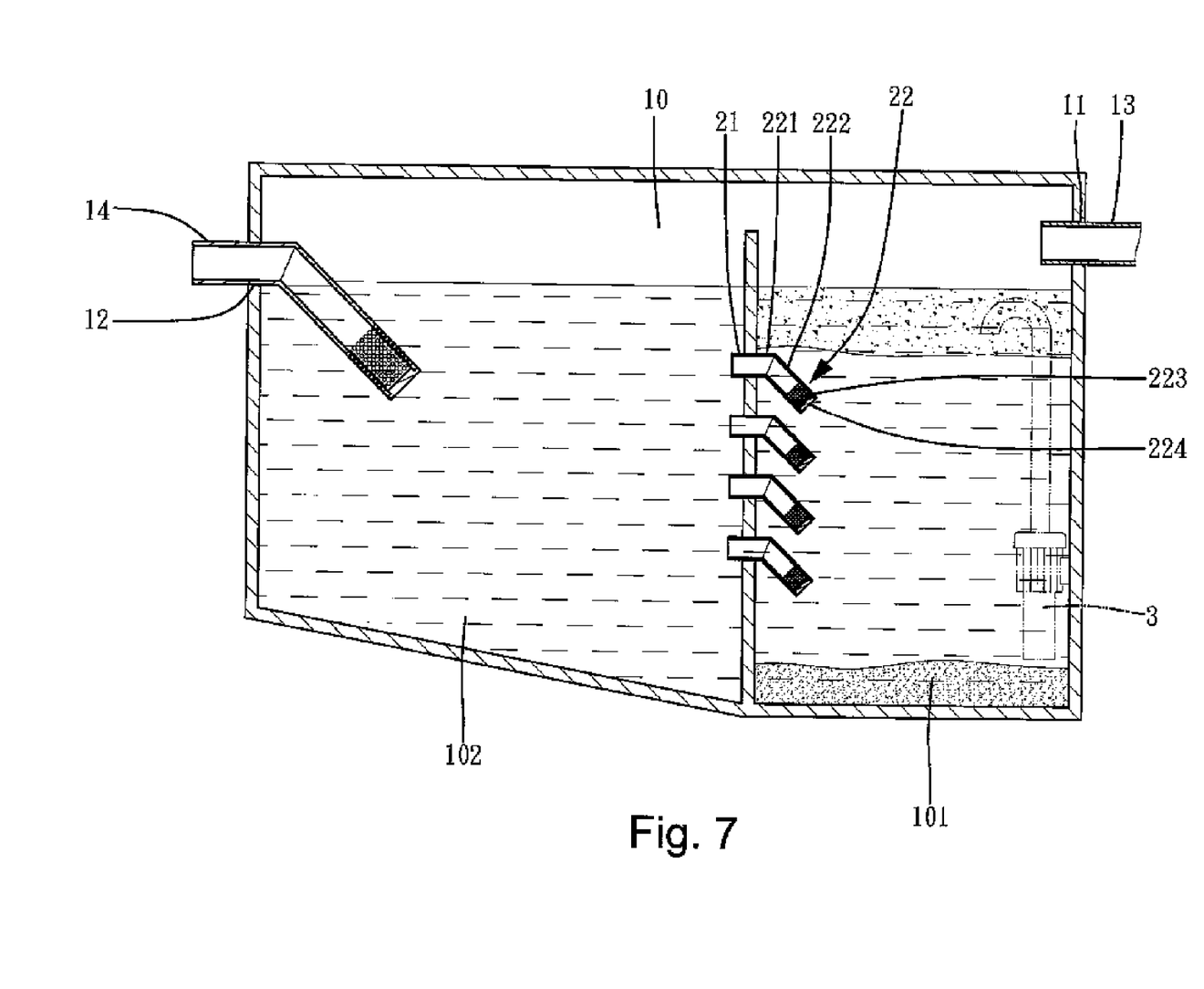
FIG. 7 is a sectional view of still another modified embodiment of the septic tank in accordance with the present invention.

FIG. 7 is a sectional view of still another modified embodiment of the septic tank modified from the embodiment of FIG. 5. In this embodiment, each second, inclined section 222 includes a plurality of through-holes 223 in a circumference thereof. Further, each second, inclined section 222 has a closed lower end 224. Further mechanical and biochemical purifications are provided.

Figure 8:
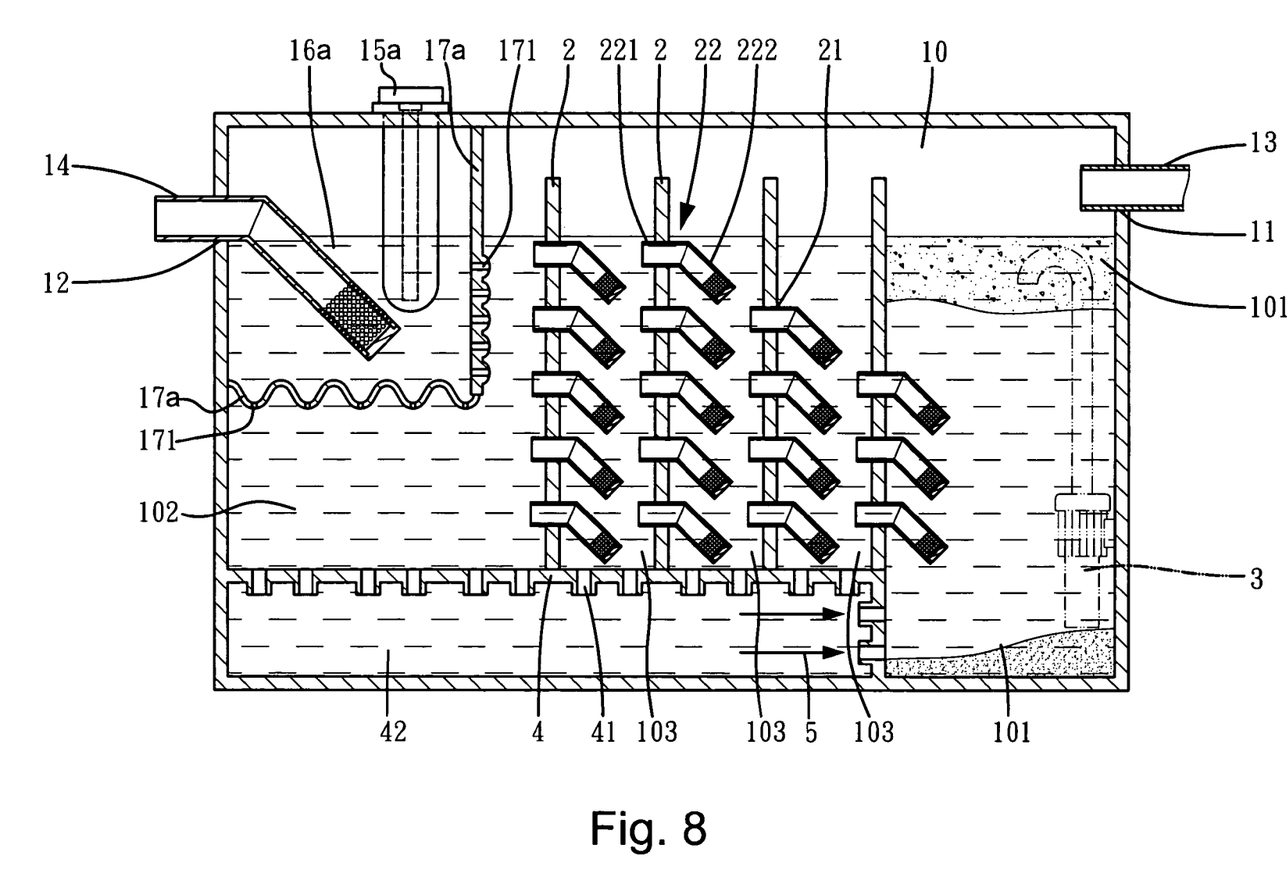
FIG. 8 is a sectional view of yet another modified embodiment of the septic tank in accordance with the present invention.

FIG. 8 is a sectional view of yet another modified embodiment of the septic tank in accordance with the present invention. In this embodiment, a plurality of partitioning members 2 are mounted in the chamber 10 of the septic tank and thus separate the chamber 10 into a plurality of subchambers 101, 102, and 103. Each partitioning member 2 includes a plurality of through-holes 21. The tubes 22 in FIG. 7 are used in this embodiment. A filtering/partitioning wall 4 with a plurality of through-holes 41 is mounted in the bottom of the chamber 10 to define a deposit compartment 42. The deposits in the subchambers 102 and 103 may be deposited in the deposit compartment 42, providing a larger space for forming a bed for nitrobacteria. A one-way flow is incurred in the deposit compartment 42 when the submersible pump 3 operates. Namely, the deposits in the deposit compartment 42 are carried back into the subchamber 101 nearest to the waste water inlet 11 along a direction indicated by arrows 5. Thus, multiple filtration and re-decomposition are obtained.

Further, a substantially L-shaped partitioning wall 17a is provided in the second subchamber 102 nearest to the waste water outlet 12 to define a discharge compartment 16a for receiving the outlet pipe 14. The partitioning wall 17a includes a plurality of openings 171, allowing the dischargeable waste water to enter the discharge compartment 16a. The suspensions in the chamber 10 are isolated from the outlet pipe 14 by the partitioning wall 17a. Further, an ultraviolet lamp 15a may be mounted in the discharge compartment 16a for killing bacteria in the discharge compartment 16a.

Figure 9:
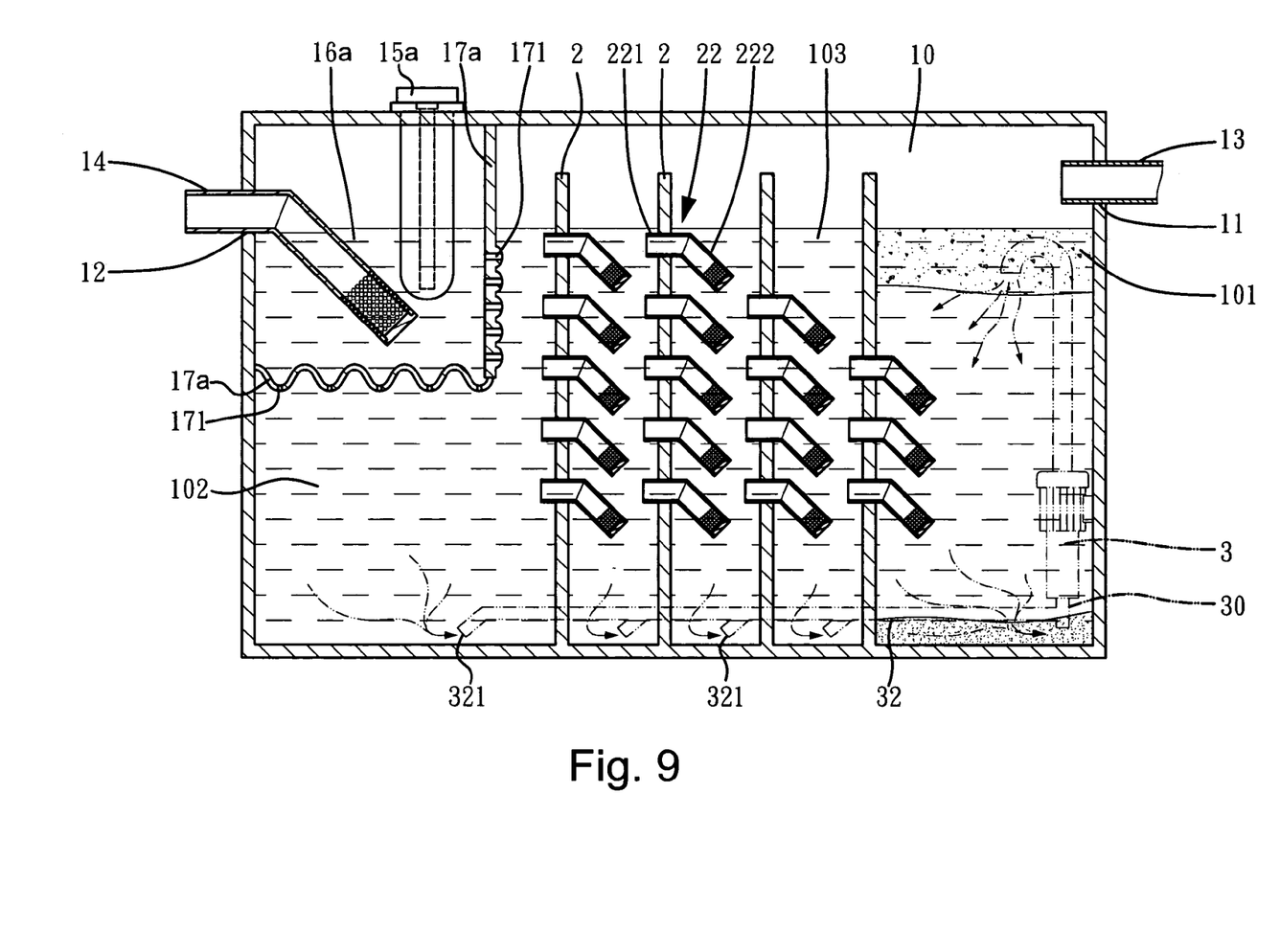
FIG. 9 is a sectional view of still another modified embodiment of the septic tank in accordance with the present invention.

FIG. 9 is a sectional view of still another modified embodiment of the septic tank modified from the embodiment in FIG. 8. In this embodiment, the filtering/partitioning wall 4 is omitted. Further, the submersible pump 3 may include a recycling tube 32 having a plurality of inlets 321 respectively in the bottoms of the subchambers 101, 102, and 103. The recycling tube 32 further includes an outlet connected to the inlet 30 of the submersible pump 3. The deposits in the bottoms of the subchambers 102 and 103 can be pumped back into the subchamber 101 for refiltering purposes. The decomposing/filtering effect is further improved.

It is noted that the tubes 22 may be of any other shapes without adversely affecting the function. Further, biochemical balls may be added into the subchambers 101, 102, and 103 for absorbing oils in the waste water from the kitchen or toilet.

Although specific embodiments have been illustrated and described, numerous modifications and variations are still possible without departing from the essence of the invention. The scope of the invention is limited by the accompanying claims.

What is claimed is:

1. A septic tank comprising:
a chamber;
an inlet through which waste water enters the chamber;
an outlet;
an outlet pipe mounted to the outlet;
a partitioning member mounted in the chamber and separating the chamber into a first subchamber adjacent to the inlet and a second subchamber adjacent to the outlet, the partitioning member comprising a plurality of through-holes allowing communication between the first subchamber and the second subchamber; and
a plurality of tubes each including a first section extending through an associated one of the through-holes and a second section extending downward and located in the first subchamber, with the second section of each said tube having an inclining angle in a range of 30-60 degrees.

2. The septic tank as claimed in claim 1, with the second section of each said tube being inclined or arcuate.

3. A septic tank comprising:
a chamber;
an inlet through which waste water enters the chamber;
an outlet;
an outlet pipe mounted to the outlet;
a partitioning member mounted in the chamber and separating the chamber into a first subchamber adjacent to the inlet and a second subchamber adjacent to the outlet, the partitioning member comprising a plurality of through-holes allowing communication between the first subchamber and the second subchamber; and
a plurality of tubes each including a first section extending through an associated one of the through-holes and a second section extending downward and located in the first subchamber, with the second section of each said tube comprising a plurality of through-holes in a circumference thereof, and with the second section of each said tube comprising a closed end.

4. The septic tank as claimed in claim 3, with the septic tank further including a submersible pump mounted in the first subchamber, with the submersible pump pumping deposit-containing waste water in the first subcompartment upward for creating recycling currents, thereby providing a stirring effect and speeding up decomposition of the waste water.

5. The septic tank as claimed in claim 4, with the submersible pump further comprising a recycling tube including a first end connected to the submersible pump and a second end with an inlet in a bottom of the second subchamber, allowing deposits in the bottom of the second subchamber to be pumped back into the first subchamber for refiltering.

6. The septic tank as claimed in claim 4, with the septic tank further comprising a filtering/partitioning wall in a bottom of the second subchamber, with the filtering/partitioning wall extending between said partitioning member and a sidewall that defines the chamber and that includes the outlet, with the filtering/partitioning wall being spaced from a bottom wall defining the chamber, thereby defining a deposit compartment between the filtering/partitioning wall, the bottom wall, and the sidewall.

7. The septic tank as claimed in claim 6, with the submersible pump further comprising a recycling tube including a first end connected to the submersible pump and a second end with an inlet in a bottom of the second subchamber, allowing deposits in the bottom of the second subchamber to be pumped back into the first subchamber for refiltering.

8. The septic tank as claimed in claim 3, with the septic tank further comprising a filtering/partitioning wall in a bottom of the second subchamber, with the filtering/partitioning wall extending between said partitioning member and a sidewall that defines the chamber and that includes the outlet, with the filtering/partitioning wall being spaced from a bottom wall defining the chamber, thereby defining a deposit compartment between the filtering/partitioning wall, the bottom wall, and the sidewall.

9. The septic tank as claimed in claim 3, with the septic tank further comprising a substantially L-shaped partitioning wall spaced from the partitioning member, with the partitioning wall including a first end interconnected to a sidewall that defines the chamber and that includes the outlet, with the partitioning wall further including a second end and interconnected to a top wall that defines the chamber to define a discharge compartment between the partitioning wall, the sidewall, and the bottom wall for receiving the outlet pipe.

10. The septic tank as claimed in claim 9, with the partitioning wall comprising a plurality of openings.

11. The septic tank as claimed in claim 10, with the septic tank further comprising an ultraviolet lamp mounted in the discharge compartment.

12. The septic tank as claimed in claim 11, with the septic tank further comprising a filtering/partitioning wall in a bottom of the second subchamber, with the filtering/partitioning wall being spaced from the partitioning wall and the bottom wall and extending between said partitioning member and the sidewall, thereby defining a deposit compartment between the filtering/partitioning wall, the bottom wall, and the sidewall.

13. The septic tank as claimed in claim 10, with the septic tank further comprising a filtering/partitioning wall in a bottom of the second subchamber, with the filtering/partitioning wall being spaced from the partitioning wall and the bottom wall and extending between said partitioning member and the sidewall, thereby defining a deposit compartment between the filtering/partitioning wall, the bottom wall, and the sidewall.

14. The septic tank as claimed in claim 9, with the septic tank further comprising a filtering/partitioning wall in a bottom of the second subchamber, with the filtering/partitioning wall being spaced from the partitioning wall and the bottom wall and extending between said partitioning member and the sidewall, thereby defining a deposit compartment between the filtering/partitioning wall, the bottom wall, and the sidewall.

15. A septic tank comprising:

a chamber;

an inlet through which waste water enters the chamber;

an outlet;

an outlet pipe mounted to the outlet; and a partitioning member mounted in the chamber and separating the chamber into a first subchamber adjacent to the inlet and a second subchamber adjacent to the outlet, the partitioning member comprising a plurality of through-holes allowing communication between the first subchamber and the second subchamber, with said partitioning member being wavy, with said partitioning member comprising a plurality of wave crests and a plurality of wave troughs, with the through-holes being defined in the wave crests and the wave troughs.

16. The septic tank as claimed in claim 15, with each said through-hole of said partitioning member being inclined and extending downward from a second subchamber side toward a first subchamber side.

17. The septic tank as claimed in claim 15, with said partitioning member comprising an upper blocking area for preventing suspensions in the first subchamber from entering the second subchamber, with said partitioning member comprising a lower blocking area for preventing deposits in the first subchamber from entering the second subchamber, and with the through-holes being defined in an intermediate portion of said partitioning member.

* * * * *